Patented Mar. 10, 1936

2,033,374

UNITED STATES PATENT OFFICE 2,033,374

PRODUCTION OF ALKYL HALOGEN COMPOUNDS

Frederick H. Gayer, Detroit, Mich., assignor, by mesne assignments, to General Motors Corporation, Detroit, Mich., a corporation of Delaware No Drawing. Application May 12, 1933, Serial No. 670,751

8 Claims. (Cl. 260—166)

The present process relates in part to the use of the oxide of aluminum, hereinafter referred to as alumina, as a catalyst for the addition of halogen acids to olefin hydrocarbons. It has been found that alumina is an extremely efficient catalyst in bringing about the formation of alkylhalogens from a mixture of gaseous hydrochloric acid and olefins such as for example propylene. The invention, however, is not limited to hydrochloric acid but includes other halogen acids. Neither is it restricted to propylene but also may be applied to olefins higher than propylene, such as do not react with halogen acids in the absence of a catalyst.

The essential conditions for bringing about this reaction are that the alumina be of a highly porous and adsorptive structure and that its water content be within certain limits.

It is known that the properties of alumina depend to a very large extent on its method of preparation and that the number of possible varieties in which this compound may be prepared is very large. For the purpose stated in the present specification an alumina prepared by precipitation from an aluminum salt with an excess of ammonia and possessing after drying and dehydration a gel-like appearance, is of relatively little value. However, if the preparation is effected by precipitation from a solution of an alkali metal aluminate by an acid such as hydrochloric or sulphuric acid, the catalytic activity of the resulting alumina is considerably greater. Best results are obtained if less than the theoretical amount of acid is brought into reaction with the alkali metal aluminate. Thus for example if metallic aluminum is dissolved in the theoretical amount of sodium hydroxide, the alumina precipitated by addition of 50 to 90 per cent of the theoretical amount of sulphuric acid, the precipitate washed by decantation and then dehydrated a highly active catalyst results. The so-called active alumina of commerce produced by the Aluminum Company of America if properly dehydrated is also an excellent catalyst in effecting the addition of halogen acids to olefins.

The water content is of paramount importance if the alumina is to be used as a catalyst. In its air-dry condition porous alumina may contain as much as 25 per cent of water and is practically inactive. On decreasing the water content by heating to temperatures not materially higher than 500° C. the activity increases and after reaching a maximum again decreases. While alumina is still active if it contains only one per cent of water as determined by ignition to white heat, the complete removal of water by ignition deprives the alumina of catalytic activity.

The catalytic activity of alumina decreases only slightly with continued use. If, however, the activity decreased to such a point where the reaction cannot be carried out any more at a profitable rate, the catalyst can be reactivated by gently heating it in air to a temperature not materially exceeding 500° C. This treatment removes the compounds formed on the catalytic surface, which on contact with air at ordinary temperature develop beautiful blue and purple colors. Heating is continued until the alumina regained its original light color.

The temperature of the reaction for some olefins is at or near ordinary temperature, with others a higher temperature may be desired, but generally the temperature should not exceed 250° C.

The present invention is illustrated by the following example although it is not limited to conditions given in this example:

Alumina prepared from sodium aluminate by precipitation with approximately 65 per cent of the theoretical amount of sulphuric acid, or the active alumina of the Aluminum Company of America is dehydrated at a temperature of 300 to 500° C. until its water content reaches 3–5% and charged into a glass reaction tube. A current of a mixture of propylene and preferably an excess of hydrochloric acid is conducted through the layer of alumina. The ensuing reaction raises the temperature of the catalyst to a considerable extent but no cooling is required in the case of propylene and hydrochloric acid. The gaseous mixture leaving the reaction tube is cooled to a temperature higher than the boiling point of propylene and practically pure isopropyl chloride is condensed in the receiver. With the aid of five grams of alumina ten grams or more of isopropyl chloride can be produced per hour over a period of thirty hours and the catalyst is still highly active.

I have also found that catalysts used, for example, in the polymerization of olefins, as set forth in my application Serial No. 659,842, may be reactivated by heating in the presence of air followed by a suitable subsequent treatment. The catalyst described in the application mentioned comprises a porous and highly adsorptive mixture of silica and alumina obtained by hydrolytic adsorption of aluminum oxide upon a gelatinous precipitate of silica and subsequent dehydration.

After continued use the activity of the catalyst declines to a point where the reaction cannot be carried out any more at a profitable rate. It now has been found that in this case the catalyst can be reactivated in the following manner:

A current of air is conducted through the catalyst which is kept at or near 300° C. By this treatment the compounds which are adsorbed on the surface of the catalyst and are responsible for its deterioration, undergo oxidation and can be easily removed in the subsequent treatment. Following this the catalyst is treated with a solution of sodium carbonate at the boiling point of said solution. After removal of the sodium carbonate by washing a few times with water hydrochloric acid is added and allowed to act for some time at room temperature. Washing until free of chloride follows and then the activating treatment with a solution of an aluminum salt, preferably the sulfate, is effected and every subsequent operation is repeated in the same manner as has been originally done in the preparation of the catalyst. An exception is only the dehydration, the first stage of which may be done on air at the temperature of the steam bath, the final dehydration, however, is preferably accomplished in the absence of air in a current of an inert gas such as for example nitrogen or hydrogen, at the temperature of the polymerization reaction.

As a result of the reactivation the catalyst regains its original activity and is capable of producing as much polymer as the original catalyst.

The reactivation can be repeated several times without apparent loss of activity.

I claim:

1. The process of preparing halogen addition products of olefins which comprises bringing a gaseous mixture of olefin and hydrogen halide acid into contact with a catalyst consisting of porous and adsorbent alumina dehydrated to less than the normal water content of air dried alumina and sufficiently to develop material catalytic effect.

2. Process as set forth in claim 1, the temperature of the mixture being maintained below approximately 250° C.

3. Process as set forth in claim 1, the content of water in the catalyst being between the approximate limits of 3–5%.

4. Process as set forth in claim 1, the catalyst being prepared by precipitation from an alkali metal aluminate with less than the theoretical equivalent of acid, washing and subsequent partial dehydration.

5. The process of preparing halogen addition products of olefins which comprises bringing a gaseous mixture of olefin and hydrogen halogen acid into contact with a catalyst consisting of porous and adsorbent alumina dehydrated by heating at a temperature of 300–500° C. but leaving a water content in excess of approximately 1%.

6. The process of making iso-propyl chloride comprising passing a gaseous mixture of propylene and hydrochloric acid over a catalyst consisting of porous and adsorbent alumina dehydrated to a water content of 3–5%.

7. The process of making halogen addition products of olefins which comprises bringing the olefin and a hydrogen halogen acid into contact with a catalyst comprising porous and adsorbent alumina having a water content above approximately 1% and materially below 25%.

8. The process of making halogen addition products of olefins which comprises bringing the olefin and a hydrogen halogen acid into contact with a catalyst comprising porous and adsorbent alumina partially dehydrated by heating to a temperature of approximately 300–500° C.

FREDERICK H. GAYER.